(12) United States Patent
Bao et al.

(10) Patent No.: US 9,951,151 B2
(45) Date of Patent: Apr. 24, 2018

(54) MINIEMULSION POLYMERIZATION TO PREPARE DRAG REDUCERS

(75) Inventors: Zhiyi Bao, Ponca City, OK (US); Kenneth W. Smith, Tonkawa, OK (US)

(73) Assignee: LiquidPower Specialty Products Inc., Houston, TX (US)

(*) Notice: Subject to any disclaimer, the term of this patent is extended or adjusted under 35 U.S.C. 154(b) by 0 days.

(21) Appl. No.: 13/014,528

(22) Filed: Jan. 26, 2011

(65) Prior Publication Data

US 2011/0184121 A1 Jul. 28, 2011

Related U.S. Application Data

(60) Provisional application No. 61/299,200, filed on Jan. 28, 2010.

(51) Int. Cl.
*C08F 2/22* (2006.01)

(52) U.S. Cl.
CPC ..................... *C08F 2/22* (2013.01)

(58) Field of Classification Search
CPC .................. C08F 2/22; C08F 2/24
USPC ....... 524/458, 832, 503, 515, 523, 524, 525, 524/529, 533, 534; 523/175; 521/65; 526/201
See application file for complete search history.

(56) References Cited

U.S. PATENT DOCUMENTS

| | | | |
|---|---|---|---|
| 4,070,323 A | 1/1978 | Vanderhoff et al. | |
| 4,177,177 A | 12/1979 | Vanderhoff et al. | |
| 5,686,518 A * | 11/1997 | Fontenot et al. | 524/458 |
| 6,117,939 A | 9/2000 | Mathauer et al. | |
| 6,160,036 A | 12/2000 | Kommareddi et al. | |
| 6,369,135 B1 | 4/2002 | Shork et al. | |
| 7,285,582 B2 | 10/2007 | Harris et al. | |
| 2006/0148928 A1 | 7/2006 | Harris et al. | |
| 2007/0249764 A1 | 10/2007 | Shoaf et al. | |
| 2009/0149573 A1* | 6/2009 | Venzmer | C08F 283/12 523/201 |
| 2010/0093930 A1* | 4/2010 | Guo et al. | 524/832 |

FOREIGN PATENT DOCUMENTS

| | | |
|---|---|---|
| EP | 0 729 989 A2 | 9/1996 |
| WO | 2005/090851 A1 | 9/2005 |
| WO | 2008/083991 A1 | 7/2008 |
| WO | 2008083991 | 7/2008 |
| WO | WO 2008116839 A1 * | 10/2008 ............ B01F 3/0811 |

OTHER PUBLICATIONS

Fontenot et al., "Batch Polymerization of Methyl Methacrylate in Mini/Macroemulsion", J. Appl. Polym. Sci. 1993, 49, 633-655.*
Landfester, "Polyreactions in Miniemulsions", Macromol. Rapid Commun. 2001, 22, 896-936.*
Ugelstad et al., "Emulsion Polymerization of Styrene with Sodium Hexadecyl Sulphate/Hexadecanol Mixtures as Emulsifiers. Initiation in Monomer Droplets", Die Makromolekulare Chemie 1974, 175, 507-521.*
Luo et al. "P(AA-SA) latex particle synthesis via inverse miniemulsion polymerization-nucleation mechanism and its application in pH buffering", Journal of Colloid and Interface Science, 330 (2009) 170-174.*
Gorse et al. (2012): Dictionary of Construction, Surveying and Civil Engineering-buffer. Oxford University Press.*
PCT Notification of Transmittal of the International Search Report and the Written Opinion of the International Search Authority, dated Jan. 26, 2011, 11 pages.
CA Application No. 2,788,092, First Office Action, dated Feb. 20, 2017, 3 pgs.
EP Application No. 11737595.6—Communication pursuant to EP Article 94(3), dated Jun. 23, 2016, 6 pgs.
Qi, et al.; Macromolecular Rapid Communications; RAFT Inverse Miniemulsion Polymerization of Acrylamide; dated 2007; 7 total pages.
European Patent Office; Communication Pursuant to Article 94(3) EPC; for Application No. 11 737 595.6-1301; dated Jun. 23, 2016; 6 total pages.
Canadian Intellectual Property Office; Office Action; for Application No. 2,788,092; dated Aug. 20, 2017; 3 total pages.

* cited by examiner

*Primary Examiner* — Nicole Buie-Hatcher
(74) *Attorney, Agent, or Firm* — Patterson & Sheridan, LLP

(57) ABSTRACT

A method of producing a polymer latex drag reducer. The method begins by forming an aqueous solution comprising a surfactant, a buffer and water. The method then forms an organic solution comprising a monomer and a co-stabilizer. The aqueous solution and the organic solution are mixed to form an emulsion. The emulsion is then subjecting to a high shear device to produce a miniemulsion, wherein the monomers are broken into small droplets followed by polymerizing the miniemulsion with the addition of an initiator, wherein a nucleation occurs in the small monomer droplets.

14 Claims, No Drawings

MINIEMULSION POLYMERIZATION TO PREPARE DRAG REDUCERS

CROSS-REFERENCE TO RELATED APPLICATIONS

This application is a non-provisional application which claims the benefit of and priority to U.S. Provisional Application Ser. No. 61/299,200 filed Jan. 28, 2010, entitled "Miniemulsion Polymerization to Prepare Drag Reducers," which is hereby incorporated by reference in its entirety.

STATEMENT REGARDING FEDERALLY SPONSORED RESEARCH OR DEVELOPMENT

None

FIELD OF THE INVENTION

A method of producing a polymer latex drag reducer from a miniemulsion.

BACKGROUND OF THE INVENTION

A drag reducer is a composition capable of substantially reducing friction loss associated with the turbulent flow of a fluid through a conduit. Where fluids are transported over long distances, such as in oil and other hydrocarbon liquid pipelines, these friction losses result in inefficiencies that increase equipment and operations costs. Ultra-high molecular weight polymers are known to function well as drag reducers, particularly in hydrocarbon liquids. In general, drag reduction depends in part upon the molecular weight of the polymer additive and its ability to dissolve in the hydrocarbon under turbulent flow. Effective drag-reducing polymers typically have molecular weights in excess of five million.

In the past, it has been proposed that drag reducers comprising polymeric latex emulsions can be used to reduce friction loss associated with turbulent fluid flow through a conduit. The use of polymeric latex emulsion drag reducers has most commonly been proposed for application to the flow of hydrocarbon streams (e.g., crude oil, gasoline, diesel fuel, etc.) through pipelines. In order to be most effective, the drag reducer must be dissolved in the hydrocarbon stream.

Currently, a number of different commercial approaches are being taken to address the problem of preparing, dissolving, transporting and using such drag reducing polymers. A common commercial method is to prepare the polymer in dilute solutions in an inert solvent such as kerosene or other solvating material. This method utilizes a solution of high molecular weight polymer suitable for use as a drag reducing agent when produced by polymerization of alpha olefins in a hydrocarbon solvent. The entire mixture, containing polyolefin, solvent, and catalyst particles is used without separation to form dilute solutions of the polymer in crude oil or finished hydrocarbons.

Another current commercial approach to drag reduction is to polymerize alpha olefins in bulk form, mill the bulk polymer into small (50μ to 500μ) particles, and then suspend the particles in an aqueous or other (non-solvent) liquid medium. This method allows for much higher levels of active drag reducing polymer in the final product (up to about 25%).

Yet another method is to polymerize monomers with slight water solubility using emulsion polymerization. This method has the advantage that suspensions containing high levels of active drag reduction polymer (up to 45%) can be prepared. Unfortunately, the types of monomers that can be used in emulsion polymerization are not always the best choices for making drag reducing polymers for use in hydrocarbon fluids (crude oil, gasoline, and diesel fuel).

The use of miniemulsion polymerization techniques for the production of drag recuing polymer prepared with very water insoluble monomers solves the problem of using the best, water insoluble monomers for the production of drag reducers for use in hydrocarbon liquids.

SUMMARY OF THE INVENTION

A method of producing a polymer latex drag reducer. The method begins by forming an aqueous solution comprising a surfactant, a buffer and water. The method then forms an organic solution comprising a monomer and a co-stabilizer. The aqueous solution and the organic solution are mixed to form an emulsion. The emulsion is then subjected to a high shear device to produce a miniemulsion, wherein the monomers are broken into small droplets followed by polymerizing the miniemulsion with the addition of an initiator, wherein a nucleation occurs in the small monomer droplets.

DETAILED DESCRIPTION OF THE INVENTION

The present method provides a method to produce a polymer latex drag reducer. The method begins with forming an aqueous solution with a surfactant, a buffer and water in addition to forming an organic solution from a monomer and a co-stabilizer. The aqueous solution and the organic solution are mixed to form an emulsion. The emulsion is then subjected to a sonifier to produce a miniemulsion, wherein the monomers are broken into small droplets. The miniemulsion is then polymerized with the addition of an initiator, wherein the nucleation occurs in the small droplets. The initiator can be either water soluble or oil soluble. The initiator can also be produced by mixing an oxidizer and a reducer or even, a secondary buffer, an oxidizer and a reducer. The polymerization process produces a polymer latex drag reducer.

There are many benefits that can be attributed to using a miniemulsion to produce a drag reducing product. One benefit is the enhanced ability to mix water insoluble monomers together. Since nucleation occurs in small monomer droplets it is possible for the monomers to be more thoroughly mixed together. A second benefit is increased drag reducing properties. The drag reducing properties can improve 5, 10, 15, 20, 25, 30 35, 40, or even 50% by using the miniemulsion process. The drag reducing properties of the polymer do not affect the viscosity of the crude oil, more specifically heavy crude oil that it is placed into. Instead the drag reducing polymers are able to break up the turbulent flow in the pipelines that the heavy crude oil flows in, thereby improving the flow of the oil in the pipeline. Another benefit that miniemulsion polymerization provide is that water insoluble monomer do not need to transfer from monomer droplets to micelles to start polymerization as in conventional emulsion polymerization. The step of monomer diffusion is eliminated.

Suitable examples of heavy crude oils include, but are not limited to, Merey heavy crude, Petrozuata heavy crude, Corocoro heavy crude, Albian heavy crude, Bow River heavy crude, Maya heavy crude, and San Joaquin Valley heavy crude. Additionally, the crude oil can be a blend of heavy crude oil with lighter hydrocarbons or diluents. Suitable examples of blended crude oils include, but are not limited to, Western Canadian Select and Marlim Blend.

The aqueous solution contains a surfactant, a buffer and water which are stirred together. The resultant homogeneous aqueous solution can have the following properties.

| Reactant | Broad Range | Narrow Range |
| --- | --- | --- |
| Surfactant (wt % of aqueous solution) | 0-20% | 0.002-5% |
| Buffer (wt % of aqueous solution) | 0-20% | 0.001-5% |
| Water (wt % of aqueous solution) | 50-100% | 80-99.99% |

The surfactant used can include at least one high HLB anionic or nonionic surfactant. The term "HLB number" refers to the hydrophile-lipophile balance of a surfactant in an emulsion. The HLB number is determined by the methods described by W. C. Griffin in *J. Soc. Cosmet. Chem.*, 1, 311 (1949) and *J. Soc. Cosmet. Chem.*, 5, 249 (1954), which are incorporated herein by reference. As used herein, the term "high HLB" shall denote an HLB number of 7 or more. The HLB number of surfactants for use with forming the reaction mixture can be at least about 8, at least about 10, or at least 12.

Exemplary high HLB anionic surfactants include, but are not limited to, high HLB alkyl sulfates, alkyl ether sulfates, dialkyl sulfosuccinates, alkyl phosphates, alkyl aryl sulfonates, and sarcosinates. Suitable examples of commercially available high HLB anionic surfactants include, but are not limited to, sodium lauryl sulfate (available as RHODAPON LSB from Rhodia Incorporated, Cranbury, N.J.), dioctyl sodium sulfosuccinate (available as AEROSOL OT from Cytec Industries, Inc., West Paterson, N.J.), 2-ethylhexyl polyphosphate sodium salt (available from Jarchem Industries Inc., Newark, N.J.), sodium dodecylbenzene sulfonate (available as NORFOX 40 from Norman, Fox & Co., Vernon, Calif.), and sodium lauroylsarcosinic (available as HAMPOSYL L-30 from Hampshire Chemical Corp., Lexington, Mass.).

Exemplary high HLB nonionic surfactants include, but are not limited to, high HLB sorbitan esters, PEG fatty acid esters, ethoxylated glycerine esters, ethoxylated fatty amines, ethoxylated sorbitan esters, block ethylene oxide/propylene oxide surfactants, alcohol/fatty acid esters, ethoxylated alcohols, ethoxylated fatty acids, alkoxylated castor oils, glycerine esters, linear alcohol ethoxylates, and alkyl phenol ethoxylates. Suitable examples of commercially available high HLB nonionic surfactants include, but are not limited to, nonylphenoxy and octylphenoxy poly (ethyleneoxy) ethanols (available as the IGEPAL CA and CO series, respectively from Rhodia, Cranbury, N.J.), C8 to C18 ethoxylated primary alcohols (such as RHODASURF LA-9 from Rhodia Inc., Cranbury, N.J.), C11 to C15 secondary-alcohol ethoxylates (available as the TERGITOL 15-S series, including 15-S-7, 15-S-9, 15-S-12, from Dow Chemical Company, Midland, Mich.), polyoxyethylene sorbitan fatty acid esters (available as the TWEEN series of surfactants from Uniquema, Wilmington, Del.), polyethylene oxide (25) oleyl ether (available as SIPONIC Y-500-70 from Americal Alcolac Chemical Co., Baltimore, Md.), alkylaryl polyether alcohols (available as the TRITON X series, including X-100, X-165, X-305, and X-405, from Dow Chemical Company, Midland, Mich.).

The buffer can comprise any known buffer that is compatible with the initiation system such as, for example, carbonate, phosphate, and/or borate buffers. Specific buffers that can be used include potassium dihydrogen phosphate and dipotassium hydrogen phosphate.

The organic solution contains a monomer and a co-stabilizer which are stirred together. The resultant homogeneous organic solution have the following properties costabilizer are totally dissolved in the monomer

| Reactant | Broad Range | Narrow Range |
| --- | --- | --- |
| Monomer (wt % of organic solution) | 80-99.99% | 90-99% |
| Co-stabilizer (wt % of organic solution) | 0.01-20% | 1-10% |

In one embodiment of the present invention, the drag reducing polymer can comprise a plurality of repeating units of the residues of one or more of the monomers selected from the group consisting of:

(A)

wherein $R_1$ is H or a C1-C10 alkyl radical, and $R_2$ is H, a C1-C30 alkyl radical, a C5-C30 substituted or unsubstituted cycloalkyl radical, a C6-C20 substituted or unsubstituted aryl radical, an aryl-substituted C1-C10 alkyl radical, a —(CH2CH2O)$_x$—$R_A$ or —(CH2CH(CH3)O)$_x$—$R_A$ radical wherein x is in the range of from 1 to 50 and $R_A$ is H, a C1-C30 alkyl radical, or a C6-C30 alkylaryl radical;

(B)

wherein arene is a phenyl, naphthyl, anthracenyl, or phenanthrenyl, $R_3$ is CH=CH$_2$ or CH$_3$—C=CH$_2$, and $R_4$ is H, a C1-C30 alkyl radical, a C5-C30 substituted or unsubstituted cycloalkyl radical, Cl, SO$_3$, OR$_B$, or COOR$_C$, wherein $R_B$ is H, a C1-C30 alkyl radical, a C5-C30 substituted or unsubstituted cycloalkyl radical, a C6-C20 substituted or unsubstituted aryl radical, or an aryl-substituted C1-C10 alkyl radical, and wherein $R_C$ is H, a C1-C30 alkyl radical, a C5-C30 substituted or unsubstituted cycloalkyl radical, a C6-C20 substituted or unsubstituted aryl radical, or an aryl-substituted C1-C10 alkyl radical;

(C)

wherein $R_5$ is H, a C1-C30 alkyl radical, or a C6-C20 substituted or unsubstituted aryl radical;

(D)

wherein $R_6$ is H, a C1-C30 alkyl radical, or a C6-C20 substituted or unsubstituted aryl radical;

(E)

wherein R₇ is H or a C1-C18 alkyl radical, and R₈ is H, a C1-C18 alkyl radical, or Cl;

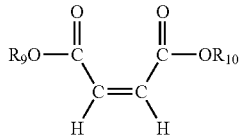
(F)

wherein R₉ and R₁₀ are independently H, a C1-C30 alkyl radical, a C6-C20 substituted or unsubstituted aryl radical, a C5-C30 substituted or unsubstituted cycloalkyl radical, or heterocyclic radicals;

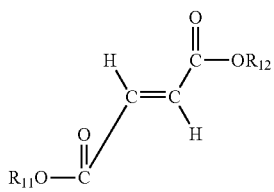
(G)

wherein R₁₁ and R₁₂ are independently H, a C1-C30 alkyl radical, a C6-C20 substituted or unsubstituted aryl radical, a C5-C30 substituted or unsubstituted cycloalkyl radical, or heterocyclic radicals;

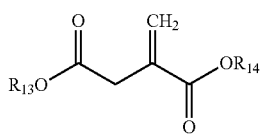
(H)

wherein R₁₃ and R₁₄ are independently H, a C1-C30 alkyl radical, a C6-C20 substituted or unsubstituted aryl radical, a C5-C30 substituted or unsubstituted cycloalkyl radical, or heterocyclic radicals;

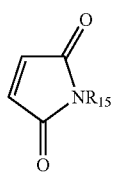
(I)

wherein R₁₅ is H, a C1-C30 alkyl radical, a C6-C20 substituted or unsubstituted aryl radical, a C5-C30 substituted or unsubstituted cycloalkyl radical, or heterocyclic radicals;

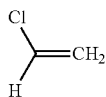
(J)

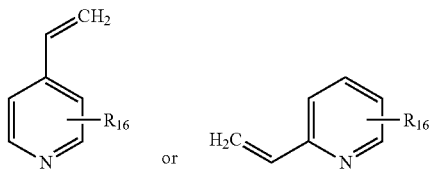
(K)

wherein R₁₆ is H, a C1-C30 alkyl radical, or a C6-C20 aryl radical;

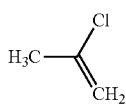
(L)

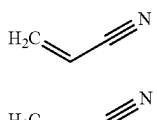
(M)

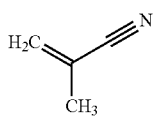
(N)

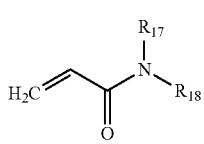
(O)

wherein R₁₇ and R₁₈ are independently H, a C1-C30 alkyl radical, a C6-C20 substituted or unsubstituted aryl radical, a C5-C30 substituted or unsubstituted cycloalkyl radical, or heterocyclic radicals;

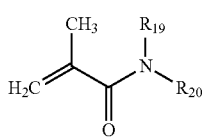
(P)

wherein R₁₉ and R₂₀ are independently H, a C1-C30 alkyl radical, a C6-C20 substituted or unsubstituted aryl radical, a C5-C30 substituted or unsubstituted cycloalkyl radical, or heterocyclic radicals.

In one embodiment of the present invention, the drag reducing polymer can comprise repeating units of the residues of C4-C20 alkyl, C6-C20 substituted or unsubstituted aryl, or aryl-substituted C1-C10 alkyl ester derivatives of methacrylic acid or acrylic acid. In another embodiment, the drag reducing polymer can be a copolymer comprising repeating units of the residues of 2-ethylhexyl methacrylate and the residues of at least one other monomer. In yet another embodiment, the drag reducing polymer can be a copolymer comprising repeating units of the residues of 2-ethylhexyl methacrylate monomers and butyl acrylate monomers. In still another embodiment, the drag reducing polymer can be a homopolymer comprising repeating units of the residues of 2-ethylhexyl methacrylate.

In one embodiment of the present invention, the drag reducing polymer can comprise the residues of at least one monomer having a heteroatom. As stated above, the term "heteroatom" includes any atom that is not a carbon or hydrogen atom. Specific examples of heteroatoms include, but are not limited to, oxygen, nitrogen, sulfur, phosphorous, and/or chlorine atoms. In one embodiment, the drag reducing polymer can comprise at least about 10 percent, at least about 25 percent, or at least 50 percent of the residues of monomers having at least one heteroatom. Additionally, the heteroatom can have a partial charge. As used herein, the term "partial charge" is defined as an electric charge, either positive or negative, having a value of less than 1.

The co-stabilizer can be any highly water insoluble small molecules that are presently known in the art. Examples of co-stabilizers that can be used include fatty alcohols ($C_{12}$-$C_{20}$), hexadecane, isohexadecane and hydrophobic oligomers such as styrene. Some of the most widely used co-stabilizers include cetyl alcohol and hexadecane. The co-stabilizer is required in to effectively stabilize the high shearing that is required to form the miniemulsion. Due to the high solubility of co-stabilizer in water insoluble monomer, so-stabilizer prevents monomer particles from coagulation and stabilizes the monomer particles after shearing.

The organic solution and aqueous solution are then mixed together to form an emulsion. The emulsion is then subjected to a high-shear device. High shear devices can be any commonly known device in the art such as sonifier, microfluidizers, static mixer or homogenizers. The high shear devices should be able to produce submicron dispersions of monomer droplets whose droplet sizes can range from 20 to 1000 nm or even 50 to 500 nm. By reducing the droplet sizes the primary loci of nucleation would occur in the droplets rather than the micelles. This increases the possibility that polymerization of the hydrophobic monomers would take place in the monomer droplets, which in turn allows the miniemulsion to prepare oil-soluble polymers as drag reducer products.

The miniemulsion is then polymerized with the addition of an initiator. The initiator can comprise of only an oxidizer and a reducer or it can contain a secondary buffer, an oxidizer and a reducer. The initiator can also be aqueous.

| Reactant | Broad Range | Narrow Range |
| --- | --- | --- |
| Secondary Buffer (wt % of polymer) | 0-20% | 0-5% |
| Oxidizer (wt % of polymer) | 0-1% | 0-0.1% |
| Reducer | 0-1% | 0-0.02% |

The secondary buffer can be any commonly used buffer. Ideal buffers are those used described above that were used in production of the homogeneous aqueous solution.

The oxidizer solution can be any commonly used oxidizer solution. In one embodiment the oxidizing solution are persulfates, peroxides or azonitrile initiators. Possible persulfate oxidizers that can be used include ammonium persulfate, sodium persulfate and potassium persulfate. Possible peroxides that can be used include hydrogen peroxide and organic peroxides.

The reducer is selected to reduce the oxidizer. In one embodiment the reducer is a salt. The reducer can be sulfites such as bisulfite or hydrosulfite, acids such as ascorbic acid or erythrobic acid, iron based reducers or even sodium formaldehyde sulfoxylate. One example of a reducer that is frequently used is ferrous ammonium sulfate, hexahydrate, $Fe(NH_4)_2(SO_4)_2 \cdot 6H_2O$.

One optional component is a secondary surfactant. The secondary surfactant can be any commonly used surfactant. Ideal surfactants are those used described above that were used in production of the homogeneous aqueous solution.

EXAMPLES

Calculation of drag reduction properties. Pipeline field testing was performed with various diameter pipelines, and various crude oils. For each of the tests the percent drag reduction (% DR) was determined by measuring the pressure drop in the segment of pipe being tested prior to addition of drag reducing agent (ΔPbase) and measuring the pressure drop in the segment of pipe being tested after addition of drag reducing agent (ΔPtreated). The percent drag reduction was then determined according to the following formula:

$$\% DR = ((\Delta Pbase - \Delta Ptreated)/\Delta Pbase) \times 100\%$$

Example 1

Batch Polymerization—300-mL Reactor

Polymer Reactants

| Component | Recipe (grams) | ± | Actual (g) |
| --- | --- | --- | --- |
| Deionized Water | 93.88 | 0.20 | 93.90 |
| Polystep B-5 | 7.52 | 0.05 | 7.53 |
| Tergitol 15-S-7 | 8.00 | 0.05 | 8.00 |
| Phosphate buffer (87.0 g potassium dihydrogen phosphate 68.0 g potassium hydrogen phosphate in 1000 mL deionized water) | 2.60 | 0.02 | 2.60 |
| Ammonium persulfate solution | 4.00 | 0.02 | 4.02 |
| 2-Ethylhexyl methacrylate | 80.00 | 0.20 | 80.00 |

Oxidizer Solution

| Component | Weight (g) | ± | Actual (g) |
| --- | --- | --- | --- |
| Ammonium persulfate, $(NH_4)_2S_2O_8$ | 0.133 | 0.005 | 0.1331 |
| Deionized Water | 40.00 | 0.05 | 40.02 |

The emulsion was done in a reactor for four hours under nitrogen at a temperature set around 2.0° C. The agitator was set at 400 rpm. A catalyst solution was then added to the emulsion when the temperature was 5° C.

Catalyst (Iron) Solution:

| Component | Weight (g) | ± | Actual (g) |
| --- | --- | --- | --- |
| Ferrous ammonium sulfate, hexahydrate, $Fe(NH_4)_2(SO_4)_2 \cdot 6H_2O$, | 0.357 | 0.004 | 0.3573 |
| 0.010 M sulfuric acid solution (3.71 grams concentrated sulfuric acid in 3785 mL deionized water) | 50.00 | 0.05 | 50.00 |

The catalyst solution was injected over 21 hours at 188 μL/hr with a total volume injected of 3.18 mL.

The final product weight of the polymer was 200.92 grams with the following characteristics.

| sample # | Wet Weight (g) | Dry Weight (g) | % Solid | Ave. % Solid | Ave. % Polymer |
| --- | --- | --- | --- | --- | --- |
| GLT-8220-203R-a | 1.2308 | 0.5311 | 43.15 | 42.81 | 37.53 |

-continued

| sample # | Wet Weight (g) | Dry Weight (g) | % Solid | Ave. % Solid | Ave. % Polymer |
|---|---|---|---|---|---|
| GLT-8220-203R-b | 1.2424 | 0.5277 | 42.47 | | |

| sample # | Theo. % Solid | Theo. % Polymer | % conversion |
|---|---|---|---|
| GLT-8220-203R | 45.27 | 39.99 | 93.85 |

The drag reduction property of the polymer was tested at 28.8% at 2 ppm.

Example 2

Batch Polymerization—300-mL Reactor

Aqueous Solution

| Component | Recipe (grams) | ± | Actual |
|---|---|---|---|
| Deionized Water | 93.90 | 0.50 | 93.91 |
| Polystep B-5 | 4.32 | 0.02 | 4.33 |
| Tergitol 15-S-7 | 8.00 | 0.02 | 8.00 |
| Phosphate buffer (87.0 g potassium dihydrogen phosphate 68.0 g potassium hydrogen phosphate in 1000 mL DI water) | 2.60 | 0.02 | 2.61 |

Organic Solution

| Component | Recipe (grams) | ± | Actual |
|---|---|---|---|
| Ethylhexyl methacrylate | 80.00 | 0.50 | 80.05 |
| Cetyl alcohol | 3.20 | 0.02 | 3.21 |

The aqueous solution and the organic solution where then mixed together and subjected to a high shear device. The jacket temperature set to around 2.0° C. and the agitator at 400 rpm. The emulsion was sheared under nitrogen for 1 hour.

Oxidizer Solution

| Component | Weight (g) | ± | Actual |
|---|---|---|---|
| Ammonium persulfate, $(NH_4)_2S_2O_8$ | 0.133 | 0.001 | 0.133 |
| Deionized Water | 40.00 | 0.05 | 40.01 |

The oxidizer solution was injected into the miniemulsion at 0.10 mL/minute over 40 minutes while still under nitrogen.

Catalyst (Iron) Solution:

| Component | Weight (g) | ± | Actual |
|---|---|---|---|
| Ferrous ammonium sulfate, hexahydrate, $Fe(NH_4)_2(SO_4)_2 \cdot 6H_2O$ | 0.1428 | 0.001 | 0.1428 |
| 0.010M sulfuric acid solution (3.71 grams concentrated sulfuric acid in 3785 mL deionized water) | 200.0 | 0.05 | 200.00 |

The catalyst (iron) solution was injected into the miniemulsion when the miniemulsion was 5° C. The syringe pump was programmed to deliver at 188 μL/hr for 21 hours a total of 2.91 mL of the catalyst.

The final product weight of the polymer was 187.52 grams with the following characteristics.

| sample # | Wet Weight (g) | Dry Weight (g) | % Solid | Ave. % Solid | Ave. % Polymer |
|---|---|---|---|---|---|
| GLT8220-61 | 2.2937 | 1.0780 | 47.00 | 47.06 | 40.26 |
| | 2.2736 | 1.0710 | 47.11 | | |

| sample # | Theo. % Solid | Theo. % Polymer | % conversion |
|---|---|---|---|
| GLT8220-61 | 49.22 | 42.42 | 94.91 |

The drag reduction property of the polymer was tested at 36.4% at 2 ppm.

Example 3

Batch Polymerization—300-mL Reactor

Polymer Reactants

| Component | Recipe (grams) | ± | Actual |
|---|---|---|---|
| Deionized Water | 93.88 | 0.20 | 93.88 |
| Polystep B-5 | 7.52 | 0.05 | 7.52 |
| Tergitol 15-S-7 | 8.00 | 0.05 | 8.01 |
| Phosphate buffer (87.0 g potassium dihydrogen phosphate 68.0 g potassium hydrogen phosphate in 1000 mL DI water) | 2.60 | 0.02 | 2.60 |
| Ammonium persulfate solution | 4.00 | 0.02 | 4.00 |
| Isodecyl methacrylate | 80.00 | 0.20 | 80.05 |

Oxidizer Solution

| Component | Weight (g) | ± | Actual |
|---|---|---|---|
| Ammonium persulfate, $(NH_4)_2S_2O_8$ | 0.133 | 0.005 | 0.133 |
| Deionized Water | 40.00 | 0.05 | 40.00 |

The reactor was purged for four hours under nitrogen at a temperature set around 5.0° C. before starting polymerization. The agitator was set at 400 rpm. A catalyst solution was then added to the emulsion when the temperature was 5° C.

Catalyst (Iron) Solution:

| Component | Weight (g) | ± | Actual |
|---|---|---|---|
| Ferrous ammonium sulfate, hexahydrate, $Fe(NH_4)_2(SO_4)_2 \cdot 6H_2O$ | 0.1428 | 0.001 | 0.1428 |

-continued

| Component | Weight (g) | ± | Actual |
|---|---|---|---|
| 0.010M sulfuric acid solution (3.71 grams concentrated sulfuric acid in 3785 mL DI water) | 400.0 | 0.05 | 400.01 |

The catalyst solution was injected over 24 hours at 330 μL/hr with a total volume injected of 4.92 mL.

The final product weight of the polymer was 197.97 grams with the following characteristics.

| sample # | Wet Weight (g) | Dry Weight (g) | % Solid | Ave. % Solid | Ave. % Polymer |
|---|---|---|---|---|---|
| GLT8220-104 | 1.5202 | 0.6725 | 44.24 | 44.27 | 38.97 |
|  | 1.5206 | 0.6737 | 44.30 |  |  |

| sample # | Theo. % Solid | Theo. % Polymer | % conversion |
|---|---|---|---|
| GLT8220-104 | 45.53 | 40.23 | 96.87 |

The drag reduction property of the polymer was tested at 0% at 2 ppm.

Example 4

Batch Polymerization—300-mL Reactor

Aqueous Solution

| Component | Recipe (grams) | ± | Actual |
|---|---|---|---|
| Deionized Water | 97.90 | 0.50 | 97.90 |
| Polystep B-5 | 4.30 | 0.02 | 4.30 |
| Phosphate buffer (87.0 g potassium dihydrogen phosphate 68.0 g potassium hydrogen phosphate in 1000 mL DI water) | 2.60 | 0.02 | 2.61 |

Organic Solution

| Component | Recipe (grams) | ± | Actual |
|---|---|---|---|
| Isodecyl methacrylate | 80.00 | 0.50 | 80.00 |
| Hexadecane | 3.20 | 0.02 | 3.20 |

The aqueous solution and the organic solution where then mixed together for 10 minutes and subjected to a high shear device. The high shear device used was a Branson sonifier at the output power setting of eight and a duty cycle of 50%. After sonification the solution was cooled down to around 5.0° C. placed under nitrogen for 1 hour Oxidizer Solution

| Component | Weight (g) | ± | Actual |
|---|---|---|---|
| Ammonium persulfate, $(NH_4)_2S_2O_8$ | 0.133 | 0.001 | 0.1330 |
| Deionized Water | 40.00 | 0.05 | 40.00 |

The oxidizer solution was injected into the miniemulsion at 0.10 mL/minute over 40 minutes while still under nitrogen.

Catalyst (Iron) Solution:

| Component | Weight (g) | ± | Actual |
|---|---|---|---|
| Ferrous ammonium sulfate, hexahydrate, $Fe(NH_4)_2(SO_4)_2 \cdot 6H_2O$ | 0.1428 | 0.001 | 0.1449 |
| 0.010M sulfuric acid solution (3.71 grams concentrated sulfuric acid in 3785 mL deionized water) | 400.0 | 0.05 | 400.00 |

The catalyst (iron) solution was injected into the miniemulsion when the miniemulsion was 5° C. The syringe pump was programmed to deliver at 330 μL/hr for 24 hours a total of 7.71 mL of the catalyst.

The final product weight of the polymer was 196.60 grams with the following characteristics.

| sample # | Wet Weight (g) | Dry Weight (g) | % Solid | Ave. % Solid | Ave. % Polymer |
|---|---|---|---|---|---|
| GLT-8391-048L-a | 1.7202 | 0.7002 | 40.70 | 40.68 | 38.24 |
| GLT-8391-048L-b | 1.6791 | 0.6828 | 40.66 |  |  |

| sample # | Theo. % Solid | Theo. % Polymer | % conversion |
|---|---|---|---|
| GLT-8391-048L | 42.93 | 40.49 | 94.44 |

The drag reduction property of the polymer was tested at 19.25% at 2 ppm.

Accordingly, the scope of protection is not limited by the description set out above, but is only limited by the claims which follow, that scope including all equivalents of the subject matter of the claims. Each and every claim is incorporated into the specification as an embodiment of the present invention. Thus the claims are a further description and are an addition to the preferred embodiments of the present invention. The discussion of any reference is not an admission that it is prior art to the present invention, especially any reference that may have a publication date after the priority date of this application.

The invention claimed is:

1. A method of forming a polymer latex drag reducer comprising:
    forming an aqueous solution comprising a surfactant, a first buffer and water;
    forming an organic solution comprising a monomer and a co-stabilizer comprising a water-insoluble molecule;
    mixing the aqueous solution and the organic solution to form an emulsion;
    subjecting the emulsion to a high shear device to produce a miniemulsion, wherein the monomers are broken into small droplets; and
    polymerizing the miniemulsion with the addition of an initiator system, wherein the initiator system comprises a second buffer, an oxidizer and a reducer, wherein a nucleation occurs in the small monomer droplets;
    wherein the polymerization produces the polymer latex drag reducer with a molecular weight in excess of five million;

wherein the monomer comprises form 80-99.99 wt % of the organic solution and wherein the initiator is only added after subjecting the emulsion to a high shear device.

2. The method of claim 1, wherein the co-stabilizer is selected from the group consisting of cetyl alcohol, hexadecane and combinations thereof.

3. The method of claim 1, wherein the high shear device is used to produce droplets ranging from 50-500 nm.

4. The method of claim 1, wherein the high shear device comprises a sonifier, a microfluidizer, a static mixer or a homogenizer.

5. The method of claim 1, wherein the drag reduction properties are improved by at least 20% compared to drag reducers not produced through a miniemulsion.

6. The method of claim 1, wherein the initiator system is aqueous.

7. The method of claim 1, wherein the aqueous solution and the organic solution are homogenous.

8. A method of forming a polymer latex drag reducer comprising:
   forming an aqueous solution comprising a surfactant, a first buffer and water;
   forming an organic solution comprising (i) a monomer comprising from 80-99.99 wt % of the organic solution; and (ii) a co-stabilizer selected from the group consisting of cetyl alcohol, hexadecane and combinations thereof;
   mixing the aqueous solution and the organic solution to form an emulsion;
   subjecting the emulsion to a high shear device to produce a miniemulsion, wherein the monomers are broken into small droplets; and
   polymerizing the miniemulsion with the addition of an initiator system, wherein the initiator system comprises a second buffer, an oxidizer and a reducer, wherein a nucleation occurs in the small monomer droplets;
   wherein the polymerization produces the polymer latex drag reducer with a molecular weight in excess of five million.

9. A method of forming a polymer latex drag reducer comprising:
   forming an aqueous solution comprising a surfactant, a first buffer and water;
   forming an organic solution comprising a monomer and a co-stabilizer comprising a water-insoluble molecule;
   mixing the aqueous solution and the organic solution to form an emulsion;
   subjecting the emulsion to a high shear device to produce a miniemulsion, wherein the monomers are broken into small droplets; and
   polymerizing the miniemulsion with the addition of an initiator system, wherein the polymerization produces the polymer latex drag reducer with a molecular weight in excess of five million, wherein the polymer latex drag reducer is produced at a temperature ranging from about 2 degrees Celsius to about 5 degrees Celsius.

10. The method of claim 9, wherein the miniemulsion is polymerized at about 5 degrees Celsius.

11. The method of claim 10, wherein the miniemulsion is produced at a temperature of about 2 degrees Celsius.

12. The method of claim 9, wherein the initiator system comprises an oxidizer and a reducer.

13. The method of claim 12, wherein the initiator system further comprises a second buffer.

14. The method of claim 13, wherein the first buffer and second buffer each comprises at least one of a carbonate, a phosphate, and a borate.

* * * * *